(12) United States Patent
Tsai

(10) Patent No.: US 7,699,539 B2
(45) Date of Patent: Apr. 20, 2010

(54) CONNECTOR FOR PLASTIC OPTICAL FIBER

(75) Inventor: Eden Tsai, Shulin (TW)

(73) Assignee: Comoss Electronic Co., Ltd., Taipei (TW)

( * ) Notice: Subject to any disclaimer, the term of this patent is extended or adjusted under 35 U.S.C. 154(b) by 0 days.

(21) Appl. No.: 12/181,370

(22) Filed: Jul. 29, 2008

(65) Prior Publication Data

US 2010/0027945 A1   Feb. 4, 2010

(51) Int. Cl.
G02B 6/036 (2006.01)
(52) U.S. Cl. ............... 385/94; 385/88; 385/93
(58) Field of Classification Search ............ 385/53, 385/88, 93, 94
See application file for complete search history.

(56) References Cited

U.S. PATENT DOCUMENTS

| | | | | |
|---|---|---|---|---|
| 3,950,075 A | * | 4/1976 | Cook et al. | 385/93 |
| 4,329,190 A | * | 5/1982 | Berg et al. | 156/60 |
| 4,658,130 A | * | 4/1987 | Durbin | 212/285 |
| 4,709,979 A | * | 12/1987 | Spodati et al. | 385/91 |
| 6,022,151 A | * | 2/2000 | Meyer-Guldner et al. | 385/92 |
| 6,231,245 B1 | * | 5/2001 | Buschelberger et al. | 385/88 |
| 2003/0007748 A1 | * | 1/2003 | Ide | 385/88 |

* cited by examiner

Primary Examiner—Uyen-Chau N Le
Assistant Examiner—Rhonda S Peace
(74) Attorney, Agent, or Firm—Chun-Ming Shih

(57) ABSTRACT

A plastic optical fiber connector includes an optical fiber connector having a plate body formed therein. On the plate body, a focusing hole is formed, the focusing hole having a holding portion extending outwardly from a side thereof. With provision of the plate body, two reception spaces are formed in the optical fiber connector, with one of which having a seat body on which an optical transceiver is provided therein, wherein a transceiver terminal of the optical transceiver is bonded to the focusing hole on the plate body. Further, a wire seat is sleeved within the optical fiber connector so that the holding portion is allowed to be placed into an optical fiber guiding hole of the wire seat.

6 Claims, 3 Drawing Sheets

CONNECTOR FOR PLASTIC OPTICAL FIBER

BACKGROUND OF THE INVENTION

1. Field of the Invention

The present invention is related to a plastic optical fiber connector, particularly to a plastic optical fiber connector in which a focusing hole can effectively and precisely align and connect an optical fiber core of an optical fiber to an optical transceiver when they are desired to be connected to each other.

2. Description of the Prior Art

Plastic optical fiber is an optical fiber having an excellent curvature and easy to be set up on spot, making itself widely applicable and realization of fiber to the home (FTTH) possible.

A plugless optical transceiver has been suggested, to which an optical fiber can be connected directly. A sheath or jacket is provided as a cladding on such optical fiber and relied upon for alignment and focusing with the optical transceiver. However, since the cladding has a relatively larger tolerance, the focusing task tends to be difficult when an optical fiber core of the plastic optical fiber has a relatively smaller diameter. In this case, an intolerable optical power loss may occur between the optical fiber and the optical transceiver and thus deficiency may be found in the coupling between the optical fiber and optical transceiver may be found.

In view of the above, the coupling between the optical fiber and optical transceiver has its disadvantage and needs to be improved. To solve the problem, the inventor of the present invention has paid a lot of effort and finally sets forth a plastic optical fiber connector here.

SUMMARY OF THE INVENTION

It is an object of the present invention to provide a plastic optical fiber connector so that an optical fiber having an optical fiber core may be effectively and precisely connected to an optical transceiver via the optical fiber core and thus an optical power loss occurred between the optical fiber and the optical transceiver can be limited.

It is another object of the present invention to provide a plastic optical fiber connector whose structure cost are simple and low respectively.

The plastic optical fiber connector according to the present invention comprises an optical fiber connector, a seat body and a wire seat.

The optical fiber connector has a plate body formed therein. On the plate body, a focusing hole is formed, the focusing body having a holding portion extending outwardly from a side thereof. With provision of the plate body, two reception spaces are formed in the optical fiber connector, with one of which having the seat body on which an optical transceiver is provided therein, wherein a transceiver terminal of the optical transceiver is bonded to the focusing hole on the plate body. Further, the wire seat is sleeved within the optical fiber connector so that the holding portion is allowed to be placed into an optical fiber guiding hole of the wire seat. When an optical fiber having optical fiber core is desired to be inserted into and thus connected to the optical fiber connector, the optical fiber core can be precisely inserted into the transceiver terminal of the optical transceiver via the focusing hole and the optical fiber guiding hole.

These features and advantages of the present invention will be fully understood and appreciated from the following detailed description of the accompanying Drawings.

DETAILED DESCRIPTION OF THE PREFERRED EMBODIMENT

Figure 1:
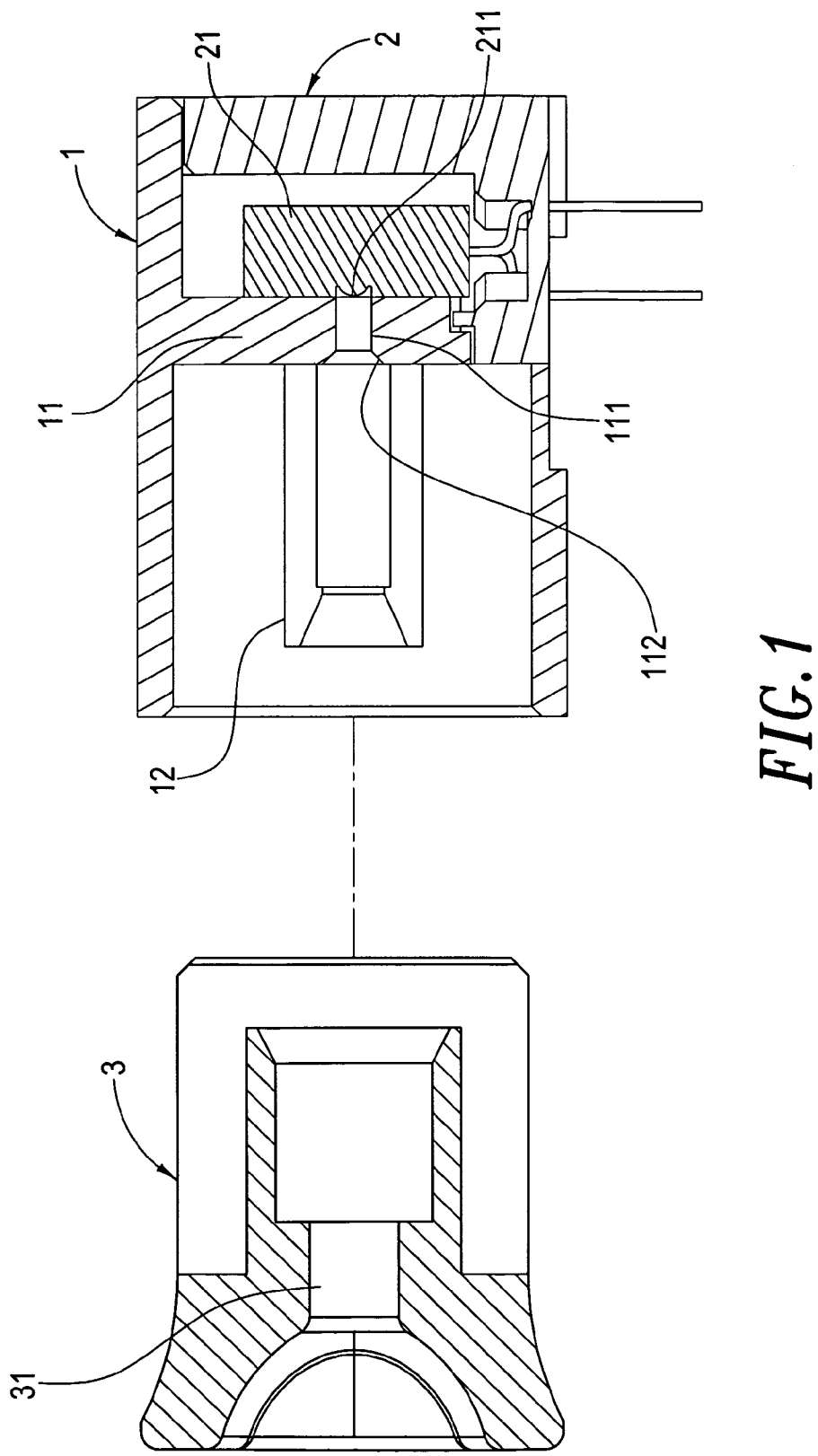
FIG. 1 is a schematic diagram of a plastic optical fiber connector in a disassembled state according to the present invention.
Figure 2:
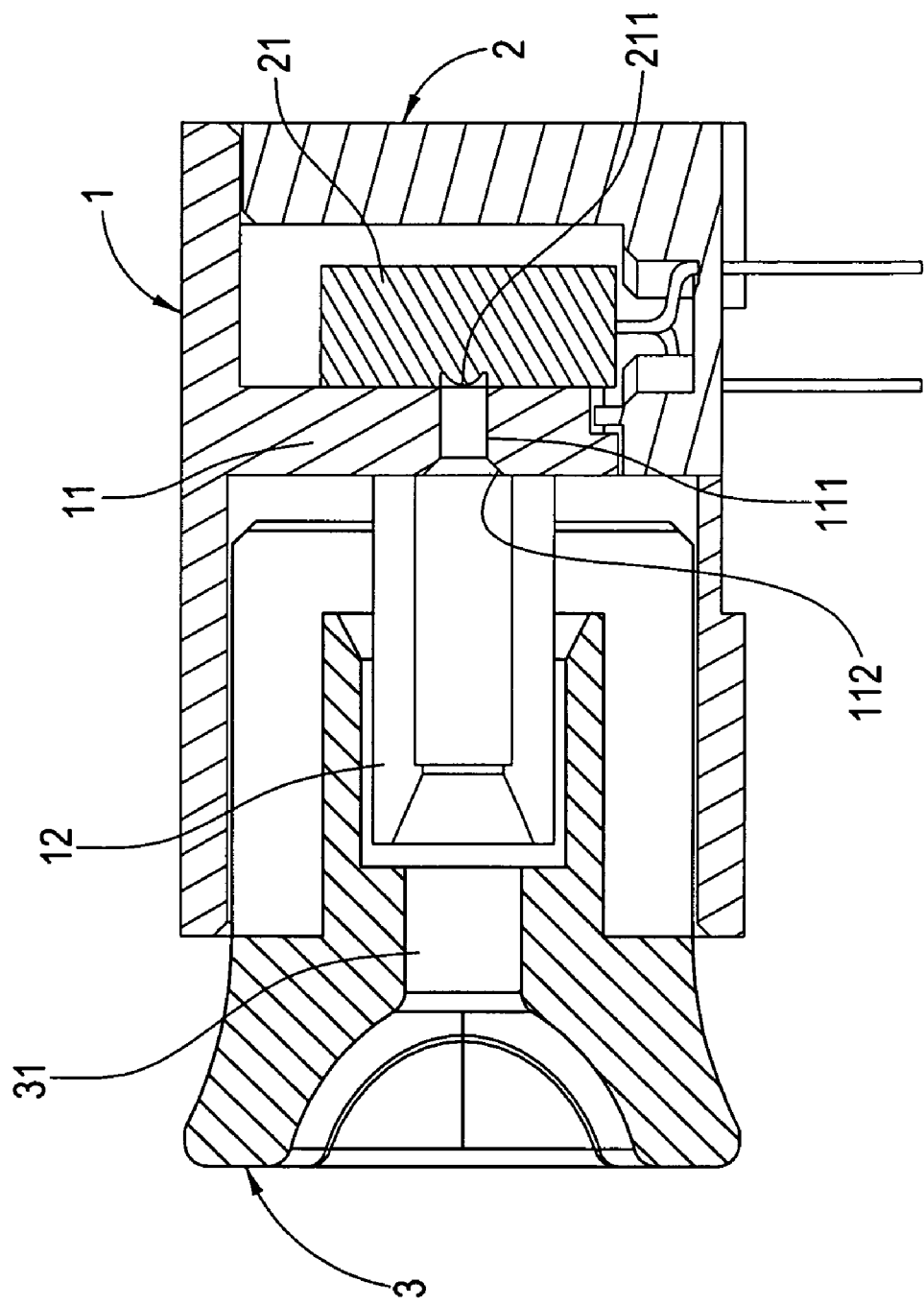
FIG. 2 is a schematic diagram of the connector shown in FIG. 1 in an assembled state according to the present invention.
Figure 3:
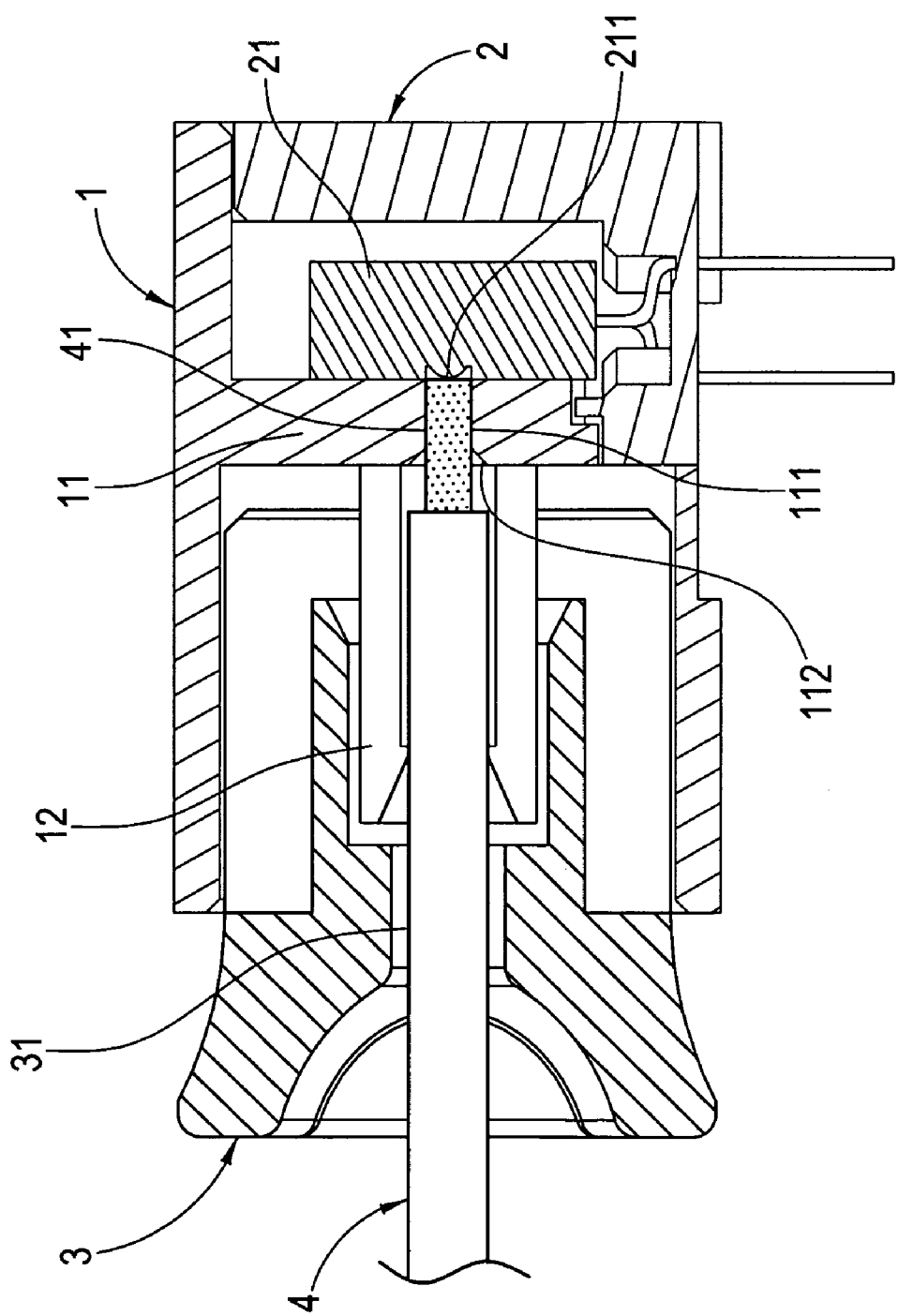
FIG. 3 is a schematic diagram of the connector shown in FIG. 1 when the plastic optical fiber is connected to an optical transceiver therein according to the present invention.

Referring to FIG. 1 through FIG. 3, a plastic optical fiber is provided in the present invention and whose structure and constituent components will be described with reference to the figures. An optical fiber connector 1 has a plate body 11 therein. On the plate body 11, a focusing hole 111 is formed at an adequate position. A holding portion 12 extends outwardly from a side of the focusing hole 111. On the focusing hole 111, a guiding face 112 is provided. Via the guiding face 112, an optical fiber 4 having optical fiber core 41 can be precisely guided into the hole 111. Meanwhile, the holding portion 12 can hole the optical fiber 4.

A seat body 2 has an optical transceiver 21 formed thereon and is formed in the optical fiber connector 1. The optical transceiver 21 has a transceiver terminal 211 formed at a front side thereof. Further, the transceiver terminal 211 is bonded to another side of the focusing hole 111 of the plate body 11.

A wire seat 3 is sleeved within the optical fiber connector 1 and has an optical fiber guiding hole 31 formed in relation to the holding portion 12 of the optical fiber connector 1. Further, the holding portion 12 van be received within the optical fiber guiding hole 31.

As compared to the prior art, the plastic optical fiber according to the present invention has the following advantages.

1. Due to provision of the focusing hole in the optical fiber connector, optical fiber core of an optical fiber can be effectively and precisely aligned and connected to each other, inhibiting an optical power loss associated with the optical fiber and the optical transceiver.

2. The plastic optical fiber is simple in structure and low in cost.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A plastic optical fiber connector, comprising:

an optical fiber connector having a plate body therein, the plate body having a focusing hole formed therein, the focusing hole having a first and second sides and a holding portion extending outwardly from the first side thereof;

a seat body having an optical transceiver formed therein and formed in the optical fiber connector, the optical transceiver having a front side having a transceiver terminal formed thereat, wherein the transceiver terminal is bonded to the second side of the focusing hole of the plate body; and a wire seat sleeved within the optical fiber connector and having an optical fiber guiding hole formed in relation to the holding portion of the optical fiber connector, wherein the holding portion is allowed to be received within the optical fiber guiding hole; wherein a guiding face is defined between the focusing hole and the holding portion and has a size gradually increasing along a direction from the focusing hole towards the holding portion.

2. The plastic optical fiber connector as claimed in claim 1, wherein the focusing hole extends from the second side to the guiding face and the guiding face extends from the focusing hole to the first side.

3. The plastic optical fiber connector as claimed in claim 2, wherein the optical fiber is held by the holding portion of the optical fiber connector.

4. The plastic optical fiber connector as claimed in claim 3, wherein a pair of opposite hooks are formed on a free end of the holding portion.

5. The plastic optical fiber connector as claimed in claim 1, wherein the optical fiber guiding hole is a stepped hole and comprises a first portion having a first diameter for receiving an optical fiber therein and a second portion having a second diameter for receiving the holding portion therein.

6. The plastic optical fiber connector as claimed in claim 5, wherein the first diameter is smaller than the second diameter.

* * * * *